A. THOMA.
SHOE BOTTOM FILLING MACHINE.
APPLICATION FILED OCT. 7, 1916.
1,335,705.
Patented Mar. 30, 1920.
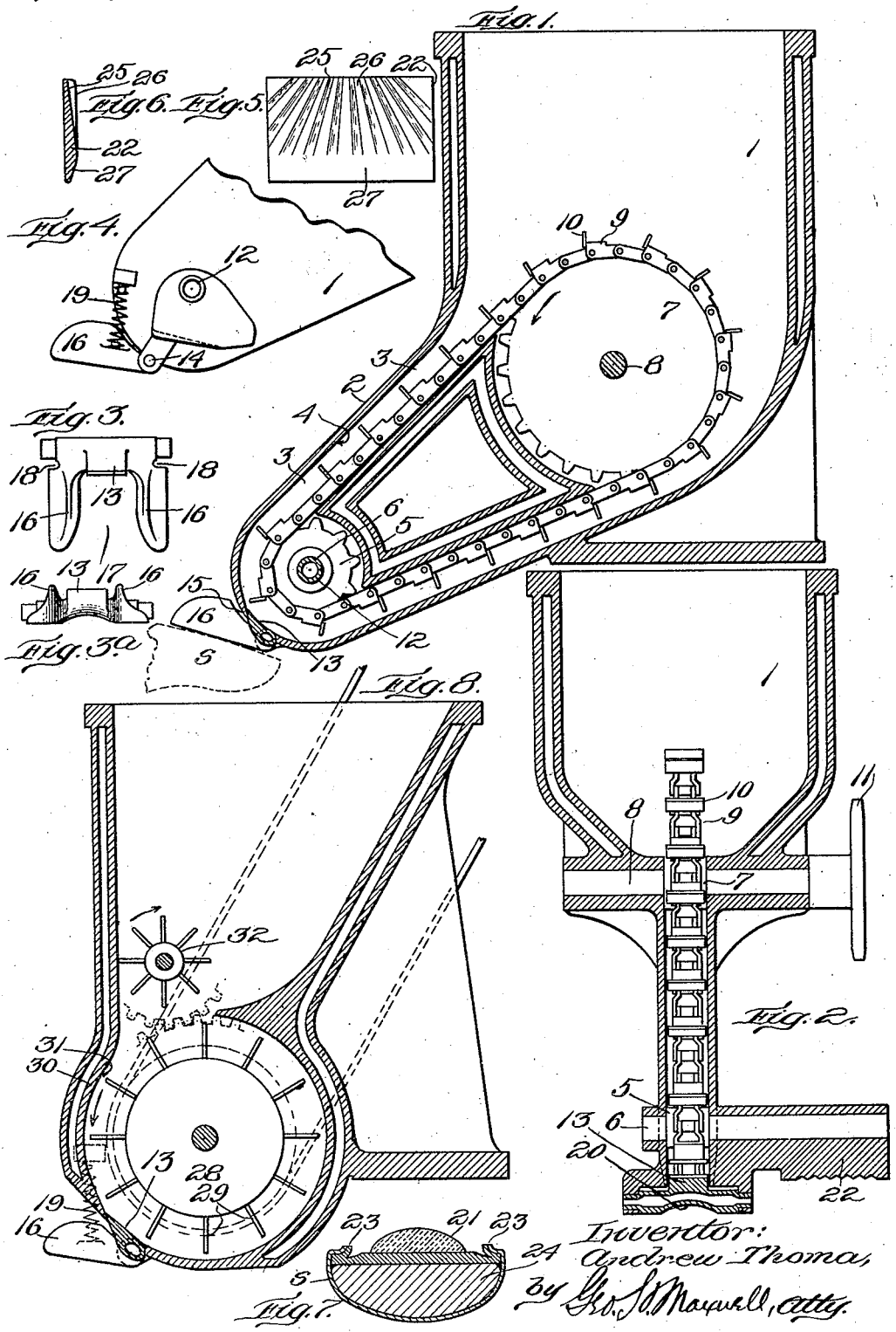
Inventor:
Andrew Thoma,
by Geo. S. Maxwell, atty.

UNITED STATES PATENT OFFICE.

ANDREW THOMA, OF CAMBRIDGE, MASSACHUSETTS, ASSIGNOR TO NORTH AMERICAN CHEMICAL COMPANY, OF NEW YORK, N. Y., A CORPORATION OF MAINE.

SHOE-BOTTOM-FILLING MACHINE.

1,335,705.  Specification of Letters Patent.  Patented Mar. 30, 1920.

Application filed October 7, 1916. Serial No. 124,268.

*To all whom it may concern:*

Be it known that I, ANDREW THOMA, a citizen of the United States, and resident of Cambridge, in the county of Middlesex and State of Massachusetts, have invented an Improvement in Shoe-Bottom-Filling Machines, of which the following description, in connection with the accompanying drawings, is a specification, like letters on the drawings representing like parts.

The automatic or partially automatic machines which have thus far been made or proposed for filling shoes, such, for example, as shown in Perri Patent No. 1,186,602, June 13, 1916, and Torrey Patent No. 1,122,661, December 29, 1915, and my own Patent No. 1,113,381, October 13, 1914, compress and condense the filler before delivery to the shoe. My present invention proceeds on exactly the opposite principle and has for one one of its chief objects the moving of the filler in a thin, *i. e.* shallow, continuous stream past the orifice without appreciable compression, so that the filler may be delivered into the shoe-bottom cavity in its normal light, disintegrated or non-compacted condition. I have found that it is possible to maintain such movement in a sufficient body of filler simply by means of the granular character of the filler and its inherent stickiness (which, although slight when the filler is in a melted condition, is nevertheless appreciable). To accomplish this, in the preferred form of my invention, I find that it is necessary to provide a relatively long, smooth surface or heated wall against which the desired body or stream of filler may move and over which it may slide, and an adjacent conveyer arranged to carry positively a layer of filler to engage and feed the stream or body of filler as stated. Such a layer, positively fed, will engage and propel a sufficient stream of loose or non-compacted filler at a sufficient speed for the purpose. The automatic ejector or delivering mechanism preferably consists of a valve or deflector positioned for operation by the shoe so as to shunt the stream of filler or a portion thereof into the shoe-bottom cavity as desired, and leave it in a more or less flattened heap from toe to shank of the cavity to be then at once flattened and spread to the proper ultimate layer-shape. By providing a heated smooth surface at a uniform distance from the conveyer, and of considerable length, the successive particles of positively held sticky filler on the conveyer are enabled to get a slight grip on corresponding particles of the adjacent loose filler and thereby gradually impart momentum to the loose particles until a continuous and contiguous stream of filler results, entirely filling the space between the smooth anti-friction surface (the heated wall) and the positive conveyer. This space measures the depth or thickness of the stream and hence the size of the outpour of filler which can be deflected by the valve. Preferably the valve is in the form of a wedge-shaped flap or lip arranged to split off all or any desired part of the stream of loose filler. When the valve or valve knife or wedge is thus turned into the stream so as to divide and split off or separate filler therefrom, the latter pours out into the shoe bottom cavity and is immediately smoothed down and condensed slightly by the forward movement of the shoe and the wedge arch shape of the contacting face of the valve, so that the deposited filler is thereby stuck together and into the shoe sufficiently to remain so placed until it is brought into contact with a heated smoothing block (or it may be a roll, as in the patents above mentioned) by which the partially compacted and condensed filler is readily spread and condensed to its final position.

In the drawings,

Figure 1 is a central, vertical, longitudinal section of the machine with a shoe illustrated in its initial position ready to operate the valve and to be filled;

Fig. 2 is a transverse sectional view so taken as to show the conveyer in top plan and the container in section;

Fig. 3 is a top plan and Fig. 3ª is a front elevation view of the combined valve or deflector, welt protector and preliminary condenser;

Fig. 4 is a fragmentary view in side elevation of the lower part of the machine looking at the right-hand side;

Figs. 5 and 6 show in bottom plan and transverse section details of the final condenser and spreader;

Fig. 7 is a transverse sectional view of a shoe to illustrate the general shape of the deposit of filler as received from the stream of filler; and Fig. 8 is a sectional view similar to Fig. 1 of a modified construction.

The pot or filler receptacle 1 may be of any desired size and shape for holding the required mass or supply of filler. As herein shown this receptacle is provided at its lower forward portion with an extension 2 containing a relatively long, narrow chamber 3 the inner surface 4 of whose outer wall is smooth and constitutes the anti-friction surface already mentioned for the heated filler to slide along without appreciable resistance. This surface is relatively long and extends down from the main supply portion or upper part of the receptacle or tank 1 to the orifice or delivery opening at the extreme lower forward edge of the extension 2 and thence back along the lower part of the chamber and receptacle to the supply portion thereof again. Any suitable form of conveyer may be provided, but as herein shown I mount a small sprocket wheel 5 on a transverse shaft 6 in the lower end of the extension 2 and a larger sprocket wheel 7 on a transverse shaft 8 in the upper portion of said extension, or as it might properly be stated, in the bottom of the main supply portion of the pot or receptacle 1. An endless conveyer chain 9 provided at frequent intervals with radial wings or floats 10 is driven by these sprocket wheels, the shaft 8 being herein shown as the positively driven shaft carrying for this purpose an external driving wheel 11. Between the outer extremities of the floats or transverse carrier wings 10, and the adjacent surface 4, is a space which is substantially uniform and relatively narrow throughout the entire length of said surface so as to act simply to hold the stream-filler against the conveying filler, i. e., against the hot sticky filler which is between successive wings 10 and whose main function is to engage by means of the small granules of the filler and the sticky binder thereon, the stream-filler which is in the space mentioned, and thereby transport said filler and produce said stream. To insure extra smooth or free movement of the filler at the delivery point, I preferably provide extra heat thereat, as by mounting the sprocket wheel 5 on a steam pipe 12. The tank or receptacle is jacketed as shown to be heated by hot water in well known manner, to keep the filler sluggishly plastic.

In the lower end of the extension or lower projecting portion 2 of the receptacle, I mount the valve already mentioned, herein shown as a wedge-shaped lip or tongue 13 pivoted on a steam pipe 14 in ears of the main casting and operating in an aperture or orifice in the wall of the extension so as to close against the edge thereof at 15. This valve is herein shown as operated by forwardly projecting wings 16 separated from each other and provided with relatively broad and flat under surfaces shaped and positioned to set flat down upon the welt or edge of shoe bottoms. These wings are sufficiently wide at their under surfaces to accommodate practically all sizes of a given kind of shoe, i. e., the same actuator or pair of wings 16 will accommodate all sizes of men's shoes, but preferably another actuator will be provided for all sizes of women's shoes and a third one for children's shoes,— although, of course, the wings may be made broad enough and the intervening space narrow enough so that one and the same device could serve for all these different kinds of shoes. The intervening space 17 between the two actuating wings is preferably relatively large and quite open so as to permit the operator to see at all times exactly how much filler is being deposited in the shoe bottom and how it is being manipulated therein. Stops are provided preferably in the shape of shoulders 18 for limiting the opening movement of the valve 13 these shoulders being arranged to contact against any convenient stationary part of the machine as against the walls respectively in the form herein shown. Springs 19 are preferably provided to insure quick valve closing. When the valve is open, the thin or shallow stream of filler is deflected by the knife-like edge of the wedge shaped valve 13 directly into the shoe bottom. As the shoe s is moved forward, this deposit of filler heaps up, more or less, and is given preliminary condensing and compression by the arch 20 just below the valve and preferably formed as a part of it. Viewing Fig. 3, it will be seen that the underside of the valve arches at the rear end of the gap 17, and viewing Fig. 2, it will be seen that this arch blends into an upward arch directly beneath the pivot of the valve, this being indicated also quite clearly in Fig. 1. The object is to provide thus a molding tool or accessory which will leave the filler in somewhat the form shown at 21 in Fig. 7 (which somewhat exaggerates the amount of filler, however, in order that the situation may be more readily appreciated even by those not skilled in the art). At one side of the delivery and molding apparatus just described, I provide a final condenser and spreader, herein shown as a block 22 preferably highly heated as by the steam pipe 12 so as to extraheat the partially laid filler and facilitate its final spreading into the desired thin, flat layer against the edge of the walls or lips 23 of the shoe bottom (the shoe being shown on a last 24 in Fig. 7). This final condenser and spreader, as herein shown, has on its underside grooves 25 and ribs 26 which flare rearwardly away from each other so as to aid in spreading the filler when the shoe is moved upwardly and rearwardly against said block. The grooves get shallow, as shown in Fig. 6, at their rear and the back portion of the spreading surface is smooth and rearwardly curved at 27. The operator ordinarily will simply force the shoe bottom thus containing the filler hard against the plate with a shifting movement sidewise for spreading the filler and will then rock the shoe so as to smooth it along the smooth and preferably curved surface 27 with the result that the flattening and final condensing operation is accomplished very quickly. In fact, the entire filling of the shoe is not intended to occupy more than two seconds in the hands of highly skilled operators and the handling of successive shoes from the rack and back to the rack and including their filling will average less than five seconds as compared with the hand filling by means of the Arnold machine (Pat. 808,227) which takes highly skilled operators about eight seconds.

Another embodiment of the invention whereby the continuous stream of filler may be maintained between the conveyer and smooth directing walls is shown in Fig. 8 although not so good as that already described inasmuch as this form of apparatus does not permit the walls to have quite sufficient length for the best results. Instead of the chain feed, a relatively large feed wheel 28 is provided having wings 29 similar to the wings 10 and a concentric wall 30 at such a distance as to permit a substantially uniform space 31 corresponding to the stream space already described in connection with Fig. 1. The wall 30 is smooth and heated so as to provide an anti-friction supporting wall for the sliding stream-filler the same as before and an auxiliary feed wheel 32 is provided in the bottom of the upper portion of the chamber so as to insure a continuous delivery of properly loosened filler to the relatively rapidly moving feed wheel 28, the valve and other delivery members being and operating the same as already described.

In operation, referring more particularly to Figs. 1-7, the heated and highly softened filler is caused to flow in a frictionally driven stream continuously along the surface 4 of the wall 2 and as a shoe is presented to the machine and is pressed against the wings 16 the valve is slightly raised or opened so as to permit the knife edge or forward end of the valve to slice or split off part or all of the stream-filler which is moving freely and rapidly in the space between the anti-friction wall 4 and the outer edges of the floats 10 of the conveyer and this deflected filler instantly heaps up in the bottom of the shoe where it is molded to substantially the shape shown in Fig. 7 by the arched underside of the valve and by the specially formed molding surfaces adjacent thereto as the shoe is quickly moved forward from toe to shank. The shoe bottom having received this central ridge of filler which is stuck therein by the molding action mentioned, is then instantly shifted by the operator to the final condensing and spreading plate 22 by means of which it is flattened level with the inseam lip and spread to fill all the cavity of the innersole. The moment the operator moves the shoe from engagement with the valve actuating means 16, the springs 19 instantly close the valve so that the stream-filler may continue to flow uninterruptedly past the orifice. This continuous flow of the filler is advantageous for speed and in fact the peculiarly sluggish nature of the filler renders it practically necessary for high speed inasmuch as the filler could not be gotten under proper motion and direction quickly enough if it had to start from a stationary position on the presentation of each shoe. The shoe bottom moves in direct contact with the orifice, and the valve mechanism is so arranged as to deliver the filler progressively toward the front in the sight of the operator as the shoe is moved in contact with said orifice. While it is being so moved, the leveling and preliminary condensing device molds the heap of filler thus delivered, said device being mounted at said orifice and preferably formed as a part of the valve itself. The intervening feed mechanism produces the continuous flow of the filler past the orifice when closed and the manually operated valve and wings 16 tend to aid in the forcible ejection of the filler when the orifice is open to regulate the delivery and pressure of the filler into the shoe bottom cavity. The position of the shoe with relation to the machine is such that the filling of the shoe is preferably in a slightly obliquely downward direction. The valve constitutes cut-off mechanism operable at the will of the operator and contains the shoe actuated operating means for opening and closing said valve to deliver and cut off the delivery of the filler. The machine is preferably constructed so as to permit the proper delivery and reception of the filler on the forward movement of the shoe only with an idle return movement. The valve controls the flow of filler through said orifice and the operating wings constitute means operable by varying the pressure of the shoe toward the orifice for controlling the opening of the valve. All the parts are so constructed and positioned that the operator can hold the shoe with both hands toward the bottom laying means adjacent the delivery portion of the machine and said laying means is so positioned as to permit the operator to thus press the shoe against the same for leveling and packing the filler into the shoe bottom cavity. When the operator lifts the shoe against members 16, this turns the valve lip 13 into the stream-filler and thereby forces the filler from the chamber and the under portion of the valve and the arched molder thereupon packs the loose filler into the cavity in a preliminary way to be then spread and firmly packed and laid by the member 22.

This invention is subordinate in certain respects to claims in my applications, Serial Nos. 314,127; 350,588 (and the divisional Patent No. 1,113,381); and 832,946; and my Patent No. 1,052,428.

It will be evident from the foregoing description that my invention is capable of a wide variety of embodiments or variations in general arrangement and constructional details of the apparatus, inasmuch as the invention is broadly novel in the provision of means for maintaining a continuous flow of a relatively thin or shallow stream of filler in a loose or uncompressed and uncompacted condition at such speed that in combination with a deflector, it may, in whole or in part, be deflected for an instant into a shoe and then permitted to continue for another deflection into another shoe and so on in rapid repetition for successive shoes. My invention is also broadly new in the provision of means practically automatic for filling within the cavities of shoe bottoms, which is nevertheless not dependent upon or controlled by the width of the shoe, but instead suppresses or prevents, at the moment, the filling of the entire width of the cavity. Again, the provision is broadly new of relatively fixed welt protectors or inseam-edge slides which confine the filler to a row or longitudinal heap in the middle of the cavity. Preferably this slide or these wings extend upwardly as shown to form a sort of hopper for properly directing and preliminarily molding this row or heap. But the main idea which constitutes the basis of the invention is provision of means for maintaining in constant progress past the orifice a small stream of filler and means operable by a shoe or the operator for instantly scooping out a cavityful of filler without interrupting the stream. The stream keeps flowing and the valve simply shoots into it in such a way and for an instant only that a cavityful of the uncompressed, normal filler is scooped out and propelled into the shoe bottom by reason of the stream-movement of the filler. This combination makes it practicable to keep up a rapid repetition of the filling movements without danger of clogging or other interference with the proper condition of the filler and the apparatus. My invention is accordingly further described and defined in the form of claims as follows:

1. A filler machine, comprising a filler receptacle, having a delivery orifice, means for maintaining a narrow stream of practically uncompressed, loose filler flowing continuously past said orifice, and deflecting means arranged to be projected into the stream of filler for momentarily deflecting a portion of said stream through said orifice into a shoe bottom cavity.

2. A filler-machine, comprising a filler receptacle, having a delivery orifice, mechanism for maintaining a shallow stream of filler continuously moving adjacent and past said orifice, said mechanism maintaining said stream with a thin, flat portion moving next to the deflecting means combined with said deflecting means, arranged to dig into said stream momentarily to deflect a part of said thin, flat portion of the stream into a shoe bottom cavity.

3. A filler machine, comprising a filler receptacle, having a long, smooth, narrow, anti-friction path on its inner wall for a stream of filler to slide over, an external orifice in said wall and path, a conveyer for holding a stream of filler lightly against said wall and rapidly sliding the same along said path, and orifice-closing means for deflecting a portion of said stream into a shoe bottom when operated to open said orifice.

4. A filler machine, comprising a filler receptacle, having a delivery orifice, a conveyer for moving a stream of filler continuously past said orifice, including a series of floats arranged to project into the filler on one side of said stream, said floats traveling at a substantially uniform distance from the wall of the receptacle for a considerable length at and on each side of said orifice, means for continuously moving said floats to maintain said continuous movement of the filler stream, and valve mechanism located in said orifice for opening the latter and deflecting the filler from said stream into a shoe bottom cavity.

5. A filler machine, comprising a filler receptacle, having a delivery orifice, a conveyer for moving a stream of filler continuously past said orifice, including a chain conveyer provided with projections arranged to receive filler at one end of said conveyer and to travel at a substantially uniform distance from the wall of the receptacle throughout the major portion of the path of travel of the conveyer, driving means for said conveyer, a delivery orifice in the wall of the receptacle at the lower end thereof, and valve mechanism in position to be actuated by a shoe presented thereto for opening said orifice and constructed and arranged to deflect filler from said stream into said shoe.

6. A filler machine, comprising a filler receptacle, a delivery orifice therein, a valve for said orifice, and valve operating mechanism to be engaged by a shoe presented thereto including relatively fixed wings spaced from each other to be slidingly engaged with the shoe and span the inseam edge and a portion of the cavity at the opposite sides of the shoe.

7. A filler machine, comprising a filler receptacle, a delivery orifice therein, a valve for said orifice, and a preliminary molding means for receiving the filler from said orifice and roughly shaping the same into a central ridge or row of filler down or lengthwise of the innersole cavity.

8. A filler machine, comprising a filler receptacle, having a delivery orifice, means for maintaining a narrow, shallow stream of practically uncompressed, loose filler flowing continuously past said orifice, deflecting means at said orifice arranged to be operated by the presentation of a shoe to be filled, and means in connection with said deflecting means for molding and partially condensing said deflected filler against the bottom of the innersole cavity of the shoe as the filler is being delivered to the latter.

9. A filler machine, comprising a filler receptacle, having a delivery orifice at its front lower portion, mechanism for feeding the filler in a loose condition therethrough into the shoe bottom on movement of the shoe in direct contact with said orifice, including valve mechanism for controlling the orifice, and spreading and condensing means located substantially in said orifice for immediately engaging and operating upon the relatively loose filler.

10. In a filler machine, filler delivery mechanism for filling a shoe bottom with a heap of filler along the middle of the cavity, and a spreader having grooves for at least a portion of its surface and containing smoothing means for condensing the filler in the shoe bottom.

11. A filler machine, comprising means operable at the will of the operator for controlling the delivery of the filler in an unvarying width, including mechanism for enabling the shoe bottom to be so presented as to receive said delivery progressively from the extreme toe of the shoe, and means for confining the delivery to a central heap lengthwise of the shoe.

12. A shoe-filler machine, comprising filler delivery mechanism including a valve, and shoe actuated operating means for opening said valve having an overhanging engagement with a shoe along the opposite side edges of the bottom cavity as the shoe is being filled.

13. A shoe-filler machine, comprising means for the delivery of filler to a shoe bottom, including a valve, opposite side portions connected with said valve for engaging the shoe, said valve side portions coöperating with the valve to afford a central view-space beneath and in front of the discharge portion of the valve proper arranged to permit the operator to see the progress of the filling operation while the shoe is engaged by said side portions.

14. A shoe-filler machine, having an orifice, means for controlling said orifice, including a valve, and a condensing and compacting device at said orifice formed as a part of the valve.

15. A shoe-filler machine, having a delivery orifice, a valve for controlling said orifice, and a welt protector arranged to overhang the opposite edges of the cavity and a portion of the cavity itself adjacent to said edges when the shoe is in position to be filled.

16. A shoe-filler machine, having a delivery orifice, means for controlling said orifice, and a yoke-shaped welt protector in position to engage the shoe at the opposite sides of the cavity when the shoe is presented at said orifice.

17. A shoe-filler machine, having a delivery orifice, means for controlling said orifice, and a welt protector having a central hopper-like opening in position to guide the filler to the central portion of the shoe cavity when the shoe is presented at said orifice.

18. A shoe-filler machine, having a delivery orifice, means for controlling said orifice, guiding means for the shoe when presented at said orifice, said guiding means having opposite portions fixed with relation to each other to be engaged by the shoe at the opposite sides of the bottom cavity.

19. A shoe-filler machine, having a delivery orifice, means for controlling said orifice, and guiding means for the shoe when presented at said orifice, said guiding means having opposite relatively fixed portions to be engaged by the shoe at the opposite sides of the bottom cavity, said portions having upwardly extending flanges with an unobstructed opening between them permitting the operator to view the bottom of the cavity as the latter is being filled.

20. A shoe-filler machine, comprising a filler receptacle, having a delivery orifice and means for maintaining a stream of practically uncompressed, loose filler flowing continuously past said orifice, combined with movable means arranged to act upon said stream momentarily at said orifice to deflect suddenly a portion of said stream through said orifice into a shoe bottom cavity.

21. A shoe-filler machine, comprising a filler receptacle, having a delivery orifice and means for maintaining a stream of practically uncompressed, loose filler flowing continuously past said orifice, combined with movable means arranged to act upon said stream momentarily at said orifice to deflect suddenly a portion of said stream through said orifice into a shoe bottom cavity, and means coöperating with the aforesaid mechanism for restricting the delivery of filler to the middle of the bottom cavity of the shoe.

In testimony whereof, I have signed my name to this specification, in the presence of two subscribing witnesses.

ANDREW THOMA.

Witnesses:
 DUNCAN L. MACINTYRE,
 GEO. H. MAXWELL.